(12) United States Patent
Wagener

(10) Patent No.: US 10,874,960 B2
(45) Date of Patent: Dec. 29, 2020

(54) WASTE PIPE MATERIAL CAPTURING DEVICE

(71) Applicant: Dallas Michael Wagener, Nisswa, MN (US)

(72) Inventor: Dallas Michael Wagener, Nisswa, MN (US)

( * ) Notice: Subject to any disclaimer, the term of this patent is extended or adjusted under 35 U.S.C. 154(b) by 88 days.

(21) Appl. No.: 16/123,531

(22) Filed: Sep. 6, 2018

(65) Prior Publication Data

US 2020/0078715 A1 Mar. 12, 2020

(51) Int. Cl.
*B01D 35/027* (2006.01)
*B01D 29/44* (2006.01)
*E04D 13/08* (2006.01)
*E04D 13/04* (2006.01)

(52) U.S. Cl.
CPC ......... *B01D 35/027* (2013.01); *B01D 29/445* (2013.01); *E04D 13/08* (2013.01); *E04D 2013/0413* (2013.01); *E04D 2013/086* (2013.01)

(58) Field of Classification Search
CPC .. E03F 1/002; E04D 13/08; E04D 2013/0813; E04D 2013/0846; E04D 13/0645; E04D 13/0767; E04D 2013/0413; E04D 2013/086; F16L 25/0009; F16L 27/00; Y10T 137/8807; B01D 29/336; B01D 29/445; B01D 35/027
USPC ....................................................... 210/162
See application file for complete search history.

(56) References Cited

U.S. PATENT DOCUMENTS

| | | | |
|---|---|---|---|
| 232,948 A * | 10/1880 | Dernham | E03F 5/0404 210/318 |
| 693,511 A * | 2/1902 | Garrett | E03F 5/0404 210/163 |
| 1,231,356 A | 6/1917 | Houge | |
| 3,587,239 A * | 6/1971 | Feland | E01F 5/005 405/125 |
| 4,472,274 A | 9/1984 | Williams | |
| 4,713,179 A * | 12/1987 | Goedderz, Sr. | E03F 7/06 210/155 |
| 5,427,679 A * | 6/1995 | Daniels | B01D 29/23 210/170.08 |
| 5,547,422 A * | 8/1996 | Seboldt | D06F 58/20 34/235 |
| 5,709,051 A | 1/1998 | Mazziotti | |

(Continued)

FOREIGN PATENT DOCUMENTS

| | | |
|---|---|---|
| CN | 202730863 | 2/2013 |
| CN | 207253883 | 4/2018 |

(Continued)

*Primary Examiner* — Claire A Norris
*Assistant Examiner* — Ekandra S. Miller-Cruz

(57) ABSTRACT

A drainage pipe un-dissolved waste catch assembly includes a panel that has a rear edge, a front edge, a first lateral edge, a second lateral edge, a top side and a bottom side. The panel has a plurality of apertures therein extending into the top side and through the bottom side. A plate is attached to and extends along the front edge and forms a angle with the top side is between 120° and 150. A coupler is attached to the top side of the panel adjacent to the rear edge and releasably engages a discharge tube such that the panel is positioned below and extends forward of the discharge tube. As waste water flows outwardly of the discharge tube, any un-dissolved materials therein will be retained on the panel.

9 Claims, 5 Drawing Sheets

(56) References Cited

U.S. PATENT DOCUMENTS

| | | | | |
|---|---|---|---|---|
| 5,779,888 | A | * | 7/1998 | Bennett .................. B01D 29/05 |
| | | | | 210/162 |
| 5,896,706 | A | * | 4/1999 | Pike ...................... E04D 13/076 |
| | | | | 52/11 |
| 6,263,618 | B1 | | 7/2001 | Jones |
| 6,497,816 | B2 | | 12/2002 | Naddy |
| 8,475,654 | B1 | | 7/2013 | Smith |
| 9,017,554 | B2 | * | 4/2015 | Bruce .................... B01D 24/24 |
| | | | | 210/293 |
| 9,702,150 | B2 | * | 7/2017 | Hall ..................... E04D 13/0722 |
| 2005/0204673 | A1 | * | 9/2005 | Reed .................. E04G 23/0229 |
| | | | | 52/514 |

FOREIGN PATENT DOCUMENTS

| | | | | |
|---|---|---|---|---|
| KR | 20170078324 | A | * 7/2017 | ............. E04D 13/04 |
| KR | 101788669 | | 10/2017 | |
| RU | 2105103 | | 2/1998 | |

* cited by examiner

WASTE PIPE MATERIAL CAPTURING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to waste capturing devices and more particularly pertains to a new waste capturing device for retaining waste materials which have not completely dissolved before reaching a water treatment apparatus. These materials can cause the water treatment apparatus to malfunction and therefore capturing these materials is essential to proper water treatment processes.

BRIEF SUMMARY OF THE INVENTION

An embodiment of the disclosure meets the needs presented above by generally comprising a panel that has a rear edge, a front edge, a first lateral edge, a second lateral edge, a top side and a bottom side. The panel has a plurality of apertures therein extending into the top side and through the bottom side. A plate is attached to and extends along the front edge and forms a angle with the top side is between 120° and 150. A coupler is attached to the top side of the panel adjacent to the rear edge and releasably engages a discharge tube such that the panel is positioned below and extends forward of the discharge tube. As waste water flows outwardly of the discharge tube, any un-dissolved materials therein will be retained on the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
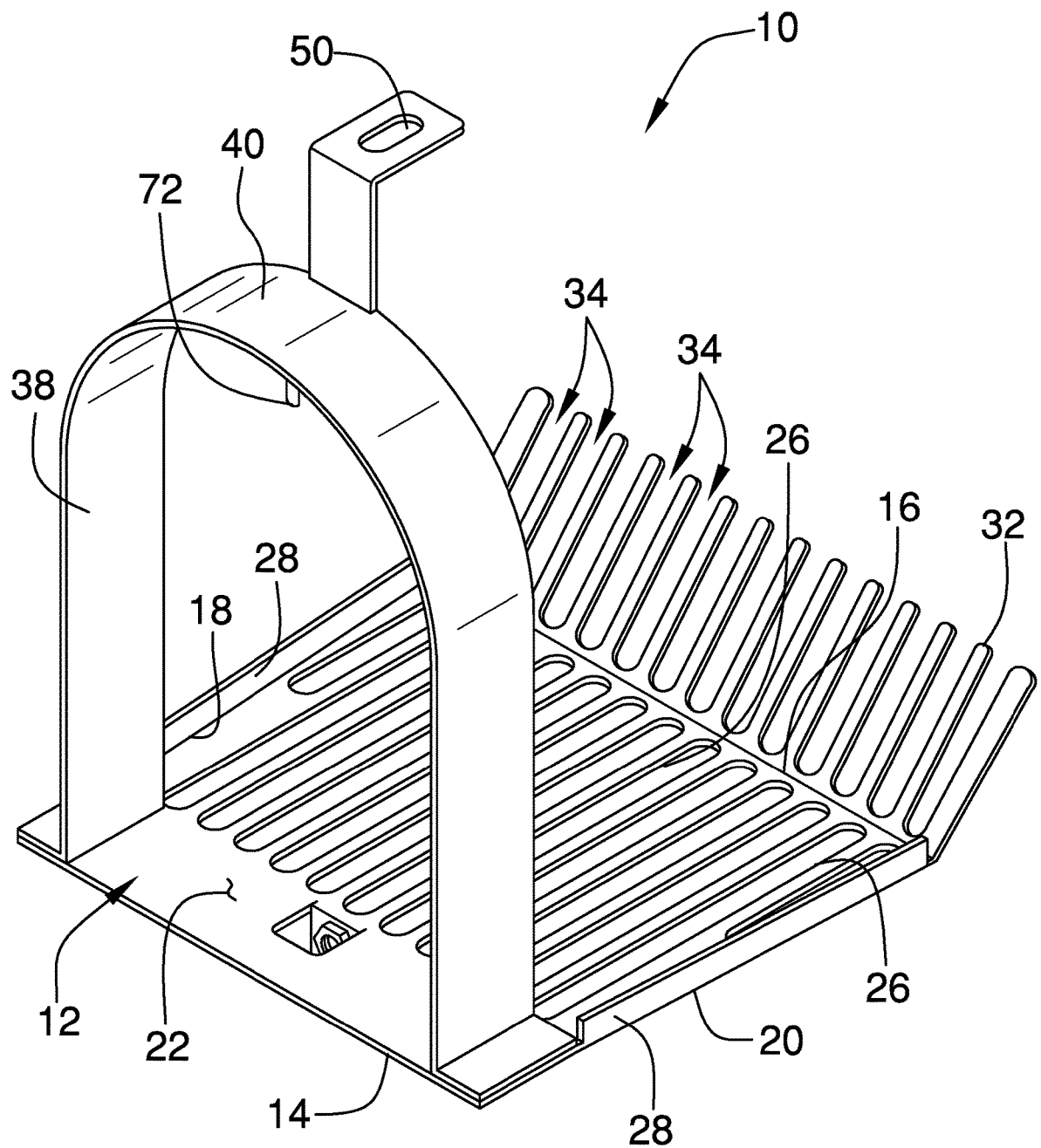
FIG. 1 is a rear left isometric view of a drainage pipe un-dissolved waste catch assembly according to an embodiment of the disclosure.
Figure 2:
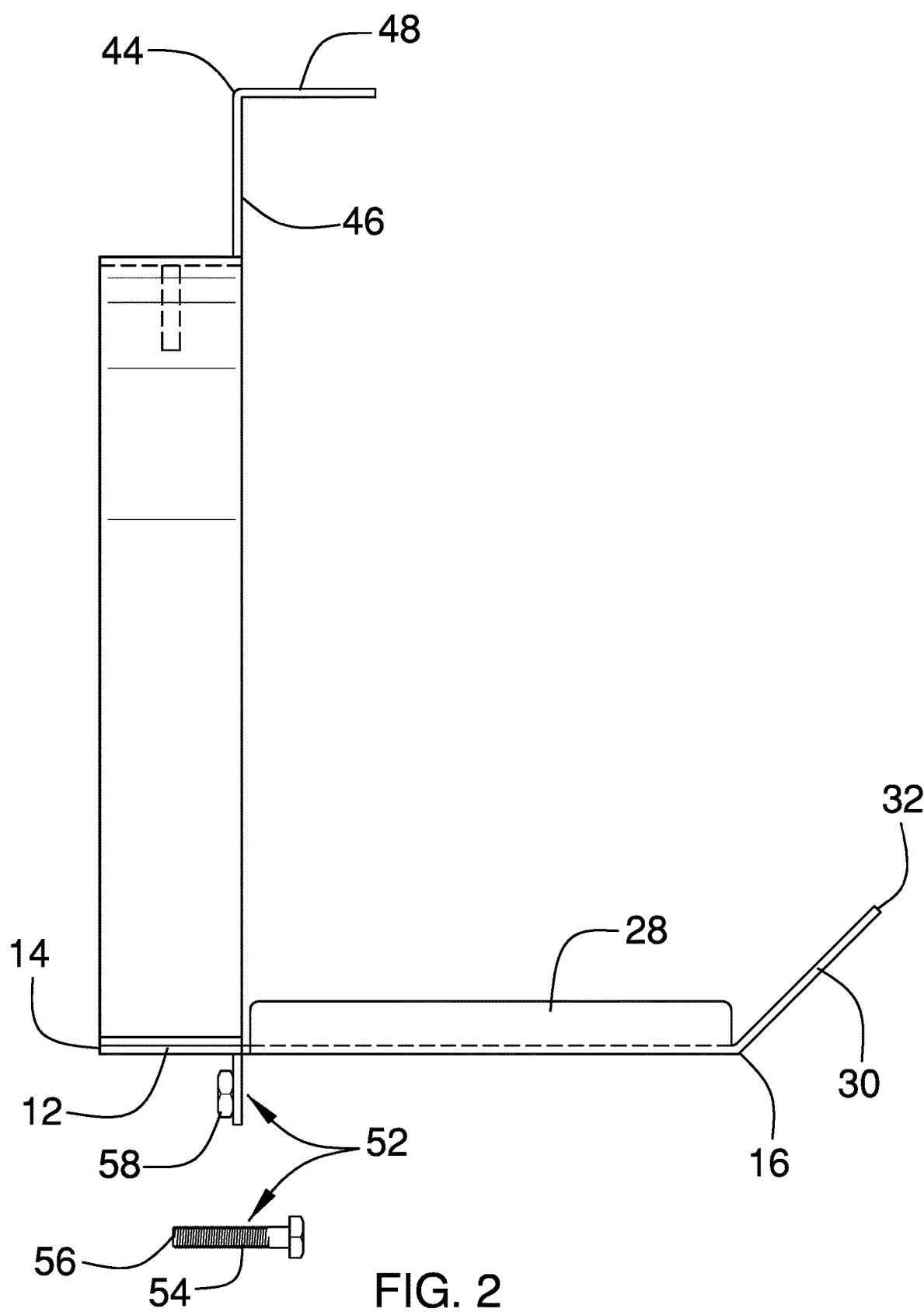
FIG. 2 is a side view of an embodiment of the disclosure.

With reference now to the drawings, and in particular to FIGS. 1 through 5 thereof, a new waste capturing device embodying the principles and concepts of an embodiment of the disclosure and generally designated by the reference numeral 10 will be described.

As best illustrated in FIGS. 1 through 5, the drainage pipe un-dissolved waste catch assembly 10 generally comprises a panel 12 that has a rear edge 14, a front edge 16, a first lateral edge 18, a second lateral edge 20, a top side 22 and a bottom side 24. The panel 12 has a plurality of apertures 26 therein extending into the top side 22 and through the bottom side 24. Each of the apertures 26 may be elongated along lines extending through the front 16 and rear 14 edges. The panel 12 may vary in size depending on usage but typically will have length from the front edge 16 to the rear edge 14 between 7.0 inches and 12.0 inches and a width from the first lateral edge 18 to the second lateral edge 20 between 5.0 inches and 11.0 inches. However, a width from the rear edge 14 to the front edge 16 may not be consistent wherein the width increases from the rear edge 14 to the front edge 16 up to 2.0 inches. A pair of lateral walls 28 is provided and each is attached to and extends upwardly from the panel 12. One of the lateral walls 28 extends along the first lateral edge 18 and one of the lateral walls 28 extends along the second lateral edge 20. The lateral walls 28 are relatively short and have a height of less than 1.0 inches extending upwardly from the panel.

A plate 30 is attached to and extends along the front edge 16. The plate 30 forms an angle with the top side 22 that is between 120° and 150°. The plate 30 has a free edge 32 positioned opposite of the front edge 16 and the plate 30 has a length from the front edge 16 to the free edge 32 typically between 1.0 inches and 4.0 inches. The free edge 32 may have a plurality of slots 34 therein extending toward the front edge 16 such that a plurality of tines is defined between adjacent ones of the slots 34.

Figure 3:
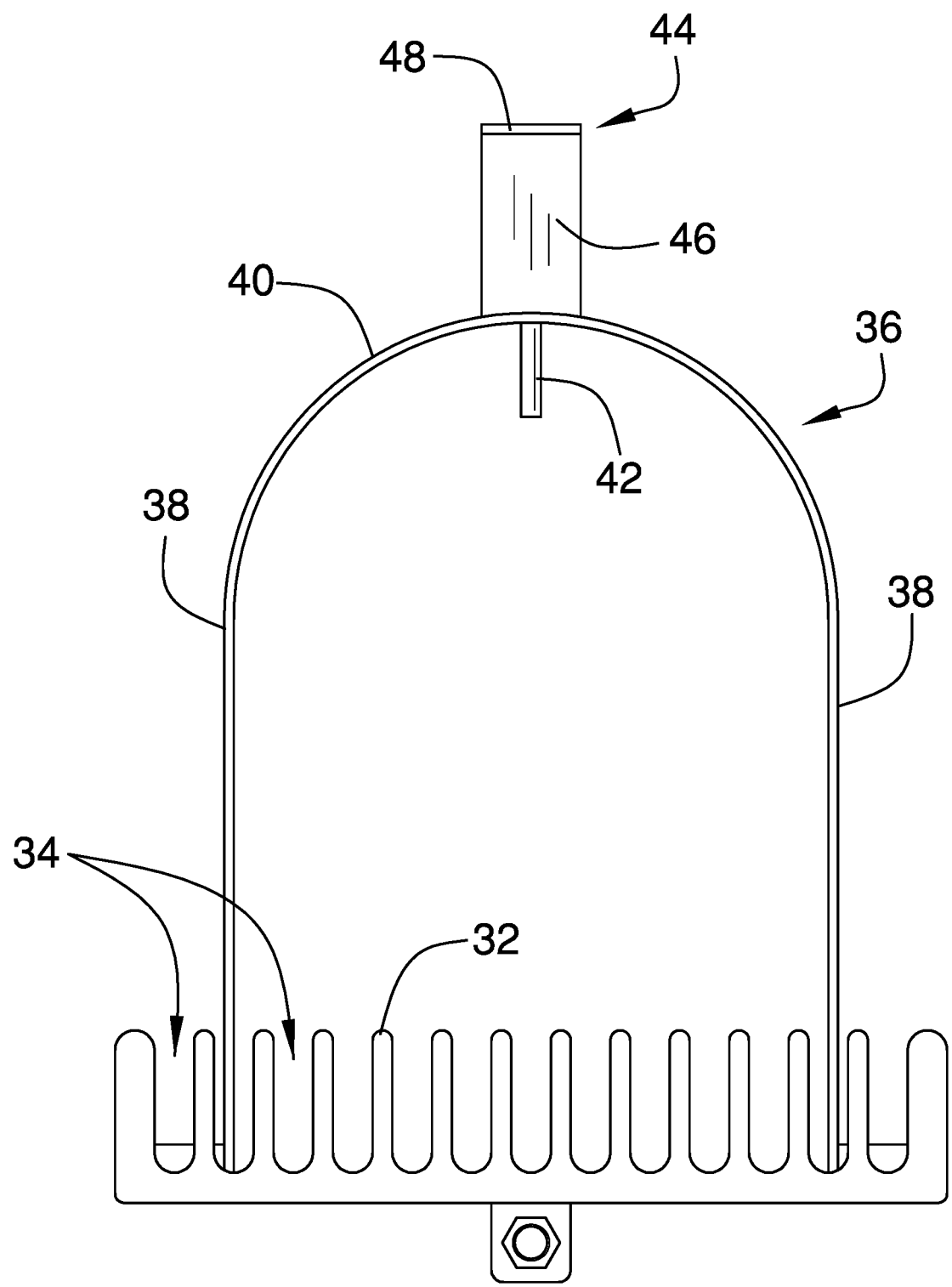
FIG. 3 is a front view of an embodiment of the disclosure.
Figure 4:
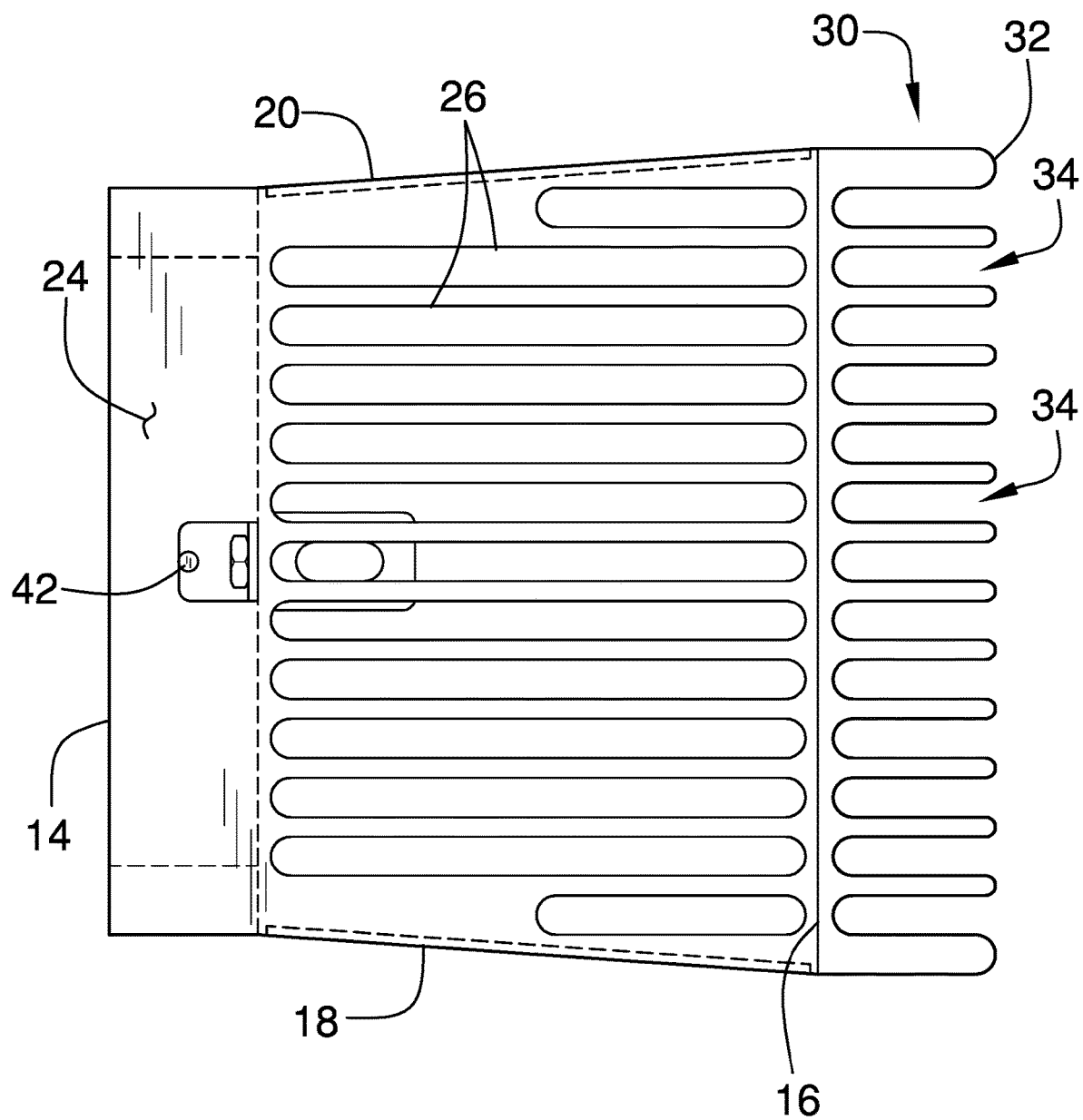
FIG. 4 is a bottom view of an embodiment of the disclosure.

As best shown in FIG. 3, a coupler 36 is attached to the top side 22 of the panel 12 adjacent to the rear edge 14 and is configured to releasably engage a discharge tube 70 such that the panel 12 is positioned below and extends forward of the discharge tube 70. The coupler 36 includes a pair of legs 38 and a central member 40 that is attached to and extends between the legs 38. The central member 40 has an upwardly extending arcuate shape such that the coupler 36 has an inverted U-shape. One of the legs 38 is positioned adjacent to the first lateral edge 18 and one of the legs 38 is positioned adjacent to the second lateral edge 20. A pin 42 is attached to the coupler 36 and extends downwardly therefrom. The pin is configured to be extended downwardly through a perimeter wall of the discharge tube 70. As such, the pin 42 is an element of the coupler 36 and prevents the central member 40 from sliding off of or rotating relative to the discharge tube 70. The pin 42, particularly, may be attached to a lower surface of the central member 40. A height from the panel 12 to an apex of the central member 40 is between 9.0 inches and 13.0 inches.

A grip 44 is attached to and extends upwardly from the coupler 36. The grip 44 may include a vertical section 46 and a horizontal section 48 attached together wherein the vertical section 46 is attached to the central member 40 and extends upwardly therefrom a distance of between 1.5 inches and 4.0 inches. The horizontal section 48 may have a hole 50 extending therethrough to allow a user of the assembly 10 engage the grip 44 with a hook or other tool.

A stabilizer 52 is attached to and extends downwardly from the panel 12. The stabilizer 52 is configured to abut a tank wall 72 to prevent the panel 12 from angling downwardly from the rear edge 14 to the front edge 16. The stabilizer 52 is positioned adjacent to the rear edge 14. The stabilizer 52 includes a horizontal arm 54 that has a free end 56 directed rearwardly of the panel 12 wherein the horizontal arm 54 is movable forward or rearward such that the free end 56 is configured to be abuttable against a tank wall 72 surface. The stabilizer 52 may, particularly, include a mount 58 attached to the panel 12 wherein the horizontal arm 54 comprises a threaded rod that is threadably coupled to the mount 58.

Figure 5:
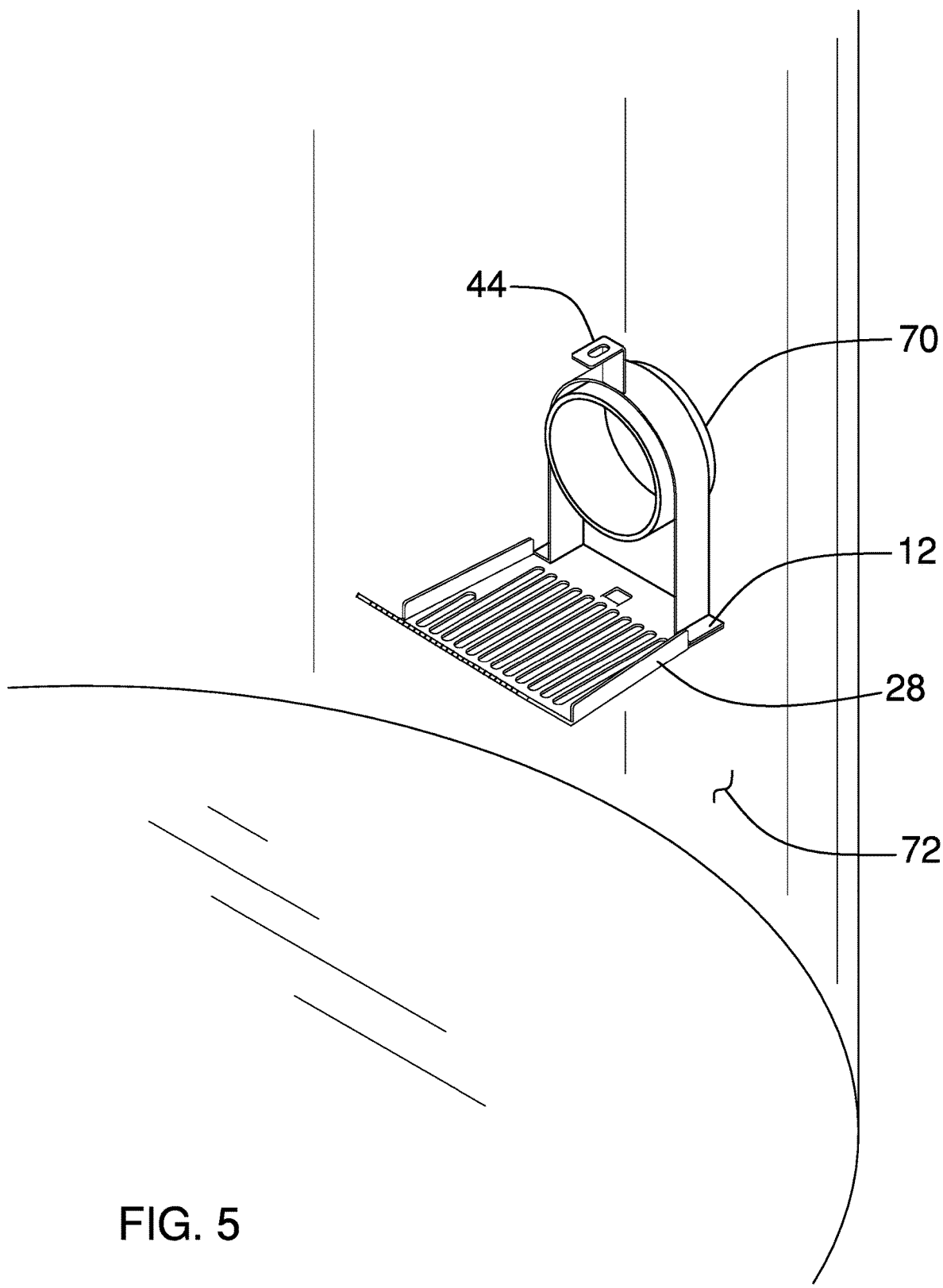
FIG. 5 is a front right isometric view of an embodiment of the disclosure.

In use, the coupler 40 is placed on the discharge pipe 70 as is shown in FIG. 5 such that the pin 42 extends through the discharge pipe 70 to retain it in place. In this position, waste water flowing from the discharge pipe 70 will strike the panel 12 and run through the apertures 26. The horizontal arm 54 is extended so that its free end 56 abuts the tank wall 72 to prevent the panel 12 from swinging back and forth relative to the tank wall 72. The apertures 26 may have a width corresponding to the size of materials to be retained on the plate and will typically have a width of less than 0.5 inches. Waste materials which have not dissolved during their journey from a drain to the discharge pipe 70, such as non-biodegradable wet wipes, will be captured by the assembly 10. The user of the assembly 10 may then use a tool to reach into the tank to engage the grip 44 so that the assembly 10 may be lifted upwardly off of the discharge pipe 70 and the waste materials taken off of the panel 12. Once cleaned, the assembly 10 is returned to the discharge tank. The capturing of the waste materials prevents damage to the water treatment equipment, which cleans the water discharged from the discharge pipe 70. The entire assembly 10 may be comprised of non-corrosive, rigid material such as stainless steel, plastics, aluminum and the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A waste catch assembly configured for engagement with a discharge tube, the waste catch assembly comprising:
   a panel having a rear edge, a front edge, a first lateral edge, a second lateral edge, a top side and a bottom side, the panel having a plurality of apertures therein extending into the top side and through the bottom side;
   a plate being attached to and extending along the front edge, the plate extending from the panel forming an angle with the top side being between 120° and 150, the plate having free lateral edges wherein the plate is planar; and
   a coupler being attached to the top side of the panel adjacent to the rear edge and being configured to releasably engage a discharge tube such that the panel is positioned below and extends forward of the discharge tube, wherein the coupler includes a pair of legs and a central member being attached to and extending between the legs, the central member having an arcuate shape such that the coupler has an inverted U-shape, one of the legs being positioned adjacent to the first lateral edge and one of the legs being positioned adjacent to the second lateral edge;
   a pin being attached to the coupler and extending downwardly therefrom, the pin being configured to be extended downwardly through a perimeter wall of the discharge tube, the pin being attached to a lower surface of the central member.

2. The waste catch assembly configured for engagement with a discharge tube according to claim 1, wherein each of the apertures is elongated along lines extending through the front and rear edges.

3. The waste catch assembly configured for engagement with a discharge tube according to claim 1, wherein the plate has a free edge positioned opposite of the front edge, the free edge having a slots therein extending toward the front edge such that a plurality of tines is defined between adjacent ones of the slots, the tines being coplanar with each other.

4. The waste catch assembly configured for engagement with a discharge tube according to claim 1, further including a grip being attached to and extending upwardly from the coupler, the grip including a vertical section and a horizontal section being attached together, the vertical section being attached to the central member.

5. The waste catch assembly configured for engagement with a discharge tube according to claim 4, wherein the horizontal section has a hole extending therethrough.

6. The waste catch assembly configured for engagement with a discharge tube according to claim 1, further including a stabilizer being attached to and extending downwardly from the panel, the stabilizer being positioned adjacent to the rear edge, the stabilizer including a horizontal arm having a free end directed rearwardly of the panel, the horizontal arm being movable forward or rearward such that the free end is configured to be abuttable against a wall surface.

7. The waste catch assembly configured for engagement with a discharge tube according to claim 6, the stabilizer including a mount attached to the panel and the horizontal arm being threadably coupled to the mount.

8. The waste catch assembly configured for engagement with a discharge tube according to claim 1, further including a pair of lateral walls each being attached to and extending upwardly from the panel, one of the lateral walls extending along the first lateral edge and one of the lateral walls extending along the second lateral edge, the panel having a length between the front edge and the rear edge of between seven and twelve inches, each of the lateral walls having a height extending from the panel less than one inch.

9. The waste catch assembly configured for engagement with a discharge tube according to claim 2, wherein the plate has a free edge positioned opposite of the front edge, the free edge having a slots therein extending toward the front edge such that a plurality of tines is defined between adjacent ones of the slots.

* * * * *